No. 774,315. PATENTED NOV. 8, 1904.
F. J. FAGOT.
WHEEL.
APPLICATION FILED JUNE 24, 1904.
NO MODEL.
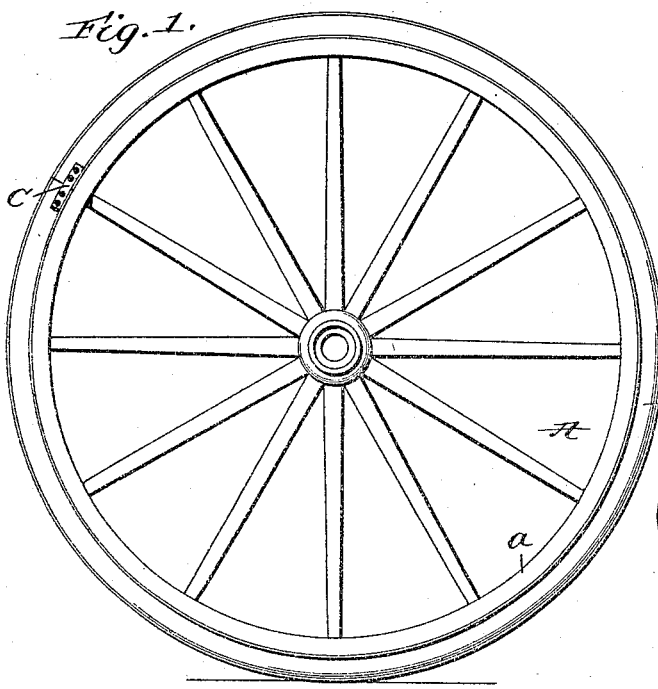
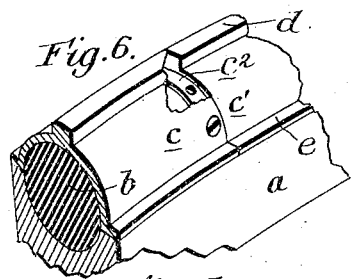
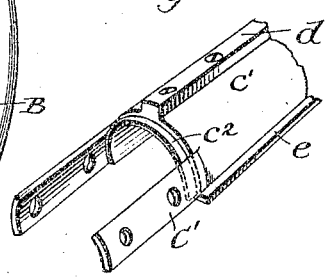
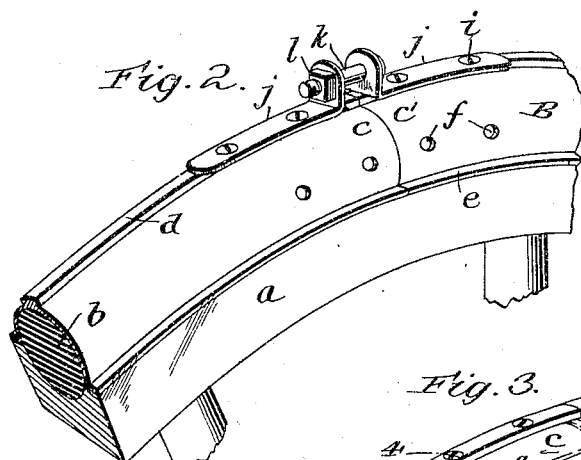
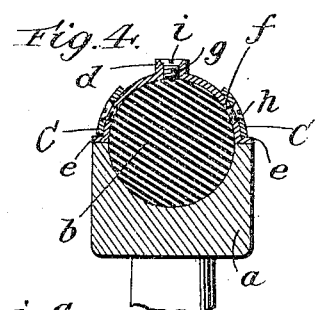
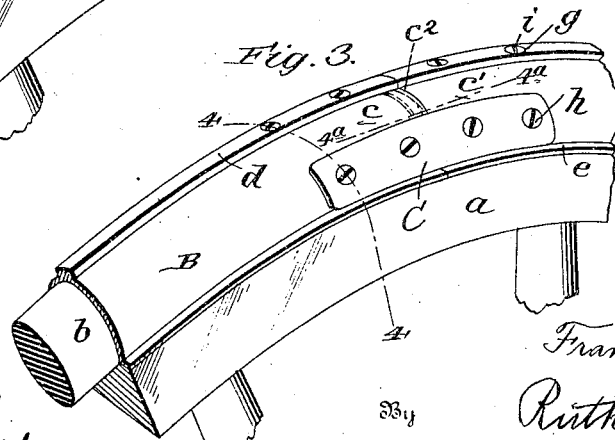
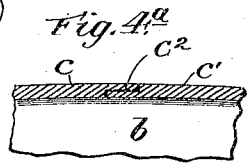
Witnesses
Inventor
Frank J. Fagot
By Rutherford and Co.
Attorneys No. 774,315.  Patented November 8, 1904.

UNITED STATES PATENT OFFICE.

FRANK J. FAGOT, OF LOWPOINT, ILLINOIS.

WHEEL.

SPECIFICATION forming part of Letters Patent No. 774,315, dated November 8, 1904.

Application filed June 24, 1904. Serial No. 214,008. (No model.)

*To all whom it may concern:*

Be it known that I, FRANK J. FAGOT, a citizen of the United States, residing at Lowpoint, in the county of Woodford and State of Illinois, have invented certain new and useful Improvements in Wheels, of which the following is a specification.

My invention relates to vehicle and other wheels having rubber tires, and has for its object to provide such a wheel embodying a metallic tire-covering, the said covering being adapted to effectually protect the rubber tire against injury incident to travel over rough and frozen roads, such as are to be found in the country in the winter season, and being also adapted to be readily removed from the wheel to expose the rubber tire for use and as readily replaced on the wheel without the employment of skilled labor.

The invention will be fully understood from the following description and claims when taken in connection with the accompanying drawings, forming part of this specification, in which—

Figure 1 is a side elevation of a wheel equipped with my novel tire-covering; Fig. 2, an enlarged detail perspective view illustrative of the manner in which the tire-covering is drawn tight over a tire; Fig. 3, a similar view illustrating the covering as it appears when ready for use; Fig. 4, a transverse section taken in the plane indicated by the line 4 4 of Fig. 3; Fig. $4^a$, a detail section taken on the line $4^a$ $4^a$ of Fig. 3; Fig. 5, a detail view illustrating a modified way of making one end of the tire-covering; and Fig. 6, a detail view similar to Fig. 3, illustrating a modification hereinafter referred to.

Referring by letter to the said drawings, and more particularly to Figs. 1 to $4^a$ thereof, A is a wheel having a rim $a$ of the ordinary or any other construction compatible with the purposes of my invention and also having a rubber tire $b$ arranged on the rim, and B is my novel tire-covering, which is of a shape and size to surround the perimeter of the wheel and is designed to be secured thereon with its ends $c$ $c'$ abutting against each other and a reduced portion $c^2$ of the end $c'$ lapped under the end $c$ in order to reinforce and support the latter, as best shown in Fig. $4^a$. The said covering, which may be of sheet-iron or other suitable metal, is of approximate semicircular form in cross-section, Fig. 4, is provided with a longitudinal central rib $d$ to prevent lateral slipping, and is also provided with outwardly-directed edge flanges $e$, arranged to bear on the perimeter of the rim $a$ at opposite sides of the tire $b$, and thereby take weight off said tire and preclude injury of the same by ice or frozen ground. The covering is further provided with threaded apertures $f$ and $g$, formed in its sides and outer portions, respectively, adjacent to its ends. The apertures $f$ are to receive screws $h$, through the medium of which connecting fish-plates C are connected to the end portions of the covering B, while the apertures $g$ have for their purpose to receive screws $i$, which temporarily connect to the end portions of the covering B the means for drawing the covering tight over a rubber tire and the ends of said covering together, as shown in Fig. 3. Said means comprises apertured lugs $j$, which the screws $i$ engage, a threaded bolt $k$, extending through the apertures of the lugs, and a nut $l$, mounted on the bolt.

In applying my novel covering the same is placed over the rubber tire of a wheel and against the perimeter of the rim thereof, after which the bolt $k$ is turned until a tight joint is made between the ends of the covering. With this done the fish-plates C are applied and connected to the covering through the medium of the screws $h$, which are countersunk, and the lugs $j$ and bolt $k$ are removed, after which the screws $i$ are replaced in the apertures $g$, Figs. 3 and 4, when the wheel as a whole is ready for use on frozen and rough roads.

It will be appreciated from the foregoing that my novel covering is adapted to be quickly and easily applied to and securely fastened on a wheel in such manner as to entirely cover the tire thereof and as readily removed from the wheel, and this without in any manner scratching, puncturing, or otherwise marring either the tire or the rim of the wheel. It will also be appreciated that the covering is calculated to prevent anything from contacting with and injuring the rubber tire and in that way materially prolongs the usefulness of the tire.

In lieu of employing separate fish-plates C, Figs. 1 and 3, I may employ fish-plates C', formed integral with the one end $c'$ of the covering, as shown in Fig. 5, said end $c'$ having a reduced portion $c^2$ to take under and reinforce and support the other end.

The ends of the covering may abut against each other or may otherwise be arranged to make a tight joint without involving a departure from the scope of my invention, although I prefer to have the ends lapped in the manner heretofore described. In this connection I desire it understood that I do not deem either the fish-plates C, Figs. 1 and 3, or the fish-plates C', Fig. 5, essential, since when the ends are lapped and screws are countersunk in the outer reduced portion of one of the ends and engage the inner reduced portion of the other end, as shown in Fig. 6, the ends are depended on to remain together and form a tight joint.

Notwithstanding the advantages which I have ascribed to my novel tire it will be noticed that the same is very simple and inexpensive and embodies no delicate parts such as are likely to get out of order after a short period of use.

While I have specifically described the construction and relative arrangement of the parts embraced in the present embodiments of my invention in order to impart a full, clear, and exact understanding of the same, I do not desire to be understood as confining myself to such specific construction and arrangement of parts, as such changes or modifications may be made in practice as fairly fall within the scope of my invention as claimed.

Having described my invention, what I claim, and desire to secure by Letters Patent, is—

1. In a wheel, the combination of a rim, a rubber tire thereon, a metallic tire-covering arranged over the tire, and having edge flanges bearing on the perimeter of the rim, at opposite sides of the tire, and also having meeting ends, and means connecting said meeting ends.

2. In a wheel, the combination of a rim, a rubber tire thereon, a metallic tire-covering arranged over the tire, and having edge flanges bearing on the perimeter of the rim, at opposite sides of the tire, and also having meeting ends, one of which is provided with a reduced portion to rest under and support and reinforce the other end, and means connecting said meeting ends of the covering.

3. In a wheel, the combination of a rim, a rubber tire thereon, a metallic covering arranged over the tire and having edge flanges bearing on the perimeter of the rim, at opposite sides of the tire, and meeting ends, one of which is arranged to rest under and support the other, and also having a longitudinal central rib on its outer side, and fish-plates disposed at opposite sides of and connecting the end portions of the covering.

In testimony whereof I have signed my name to this specification in presence of two witnesses.

FRANK J. FAGOT.

Witnesses:
A. H. BURKE,
PETER F. FAGOT.